(12) United States Patent
Wang et al.

(10) Patent No.: US 6,742,028 B1
(45) Date of Patent: May 25, 2004

(54) CONTENT MANAGEMENT AND SHARING

(76) Inventors: Frank Wang, 901 Yamato Rd., Suite 105, Boca Raton, FL (US) 33431; Richard A. Evins, 901 Yamato Rd., Suite 105, Boca Raton, FL (US) 33431; Dennis Kelly, 901 Yamato Rd., Suite 105, Boca Raton, FL (US) 33431

( * ) Notice: Subject to any disclaimer, the term of this patent is extended or adjusted under 35 U.S.C. 154(b) by 483 days.

(21) Appl. No.: 09/663,450

(22) Filed: Sep. 15, 2000

(51) Int. Cl.$^7$ .......................................... G06F 15/173
(52) U.S. Cl. ...................... 709/223; 709/203; 707/10; 707/204
(58) Field of Search ................. 709/224, 203, 709/223, 225; 707/8, 10, 204

(56) References Cited

U.S. PATENT DOCUMENTS

| | | |
|---|---|---|
| 4,007,450 A | 2/1977 | Wiedmann et al. |
| 4,432,057 A | 2/1984 | Nauckhoff et al. |
| 4,604,694 A | 8/1986 | Hough |
| 4,887,204 A | 12/1989 | Smith et al. |
| 4,937,743 A | 6/1990 | Chiang et al. |
| 5,113,519 A | 5/1992 | Smith et al. |
| 5,133,065 A | 7/1992 | Searls et al. |
| 5,301,337 A | 4/1994 | Sedgwick et al. |
| 5,319,705 A | 6/1994 | Wilkins et al. |
| 5,446,871 A | 8/1995 | McIlvain et al. |
| 5,646,992 A | 7/1997 | Hastings et al. |
| 5,713,024 A | 1/1998 | Halladay |
| 5,727,164 A | 3/1998 | Cabana et al. |
| 5,765,173 A | 6/1998 | Hirschmann et al. |
| 5,809,298 A | 9/1998 | Nakada |
| 5,822,523 A * | 10/1998 | Rothschild et al. ......... 709/236 |
| 5,933,498 A | 8/1999 | Abrams et al. |
| 5,956,508 A | 9/1999 | Selby et al. |
| 5,991,306 A | 11/1999 | Leach et al. |
| 6,014,676 A | 1/2000 | McClain |
| 6,044,374 A * | 3/2000 | Nesamoney et al. .......... 707/10 |
| 6,049,874 A | 4/2000 | Bolt et al. |
| 6,070,171 A | 5/2000 | Bliss et al. |
| 6,076,077 A | 6/2000 | Saito |

FOREIGN PATENT DOCUMENTS

EP          0877326 A2 * 11/1998  ........... G06F/17/30

OTHER PUBLICATIONS

"LAN Interconnection: A Transparent, Shortest Path Approach" IEEE 1991, pp. 1666–1670 Tai, et al.
"Reverse Path Forwarding of Broadcast Packets" 12/78, vol. 21 #21, pp. 1040–1048 (9 pages) Dalal, et al.
"An Algorithm for Distributed Computation of a Spanning Tree in an extended LAN" 1984, IEEE 802,85R1. Perlman.
IEEE Std 802–ID–1990, Standards for Local and Metropolitan Area Networks, Mar. 8, 1991, pp. 1–176, 260–261, 1–29 Media Access Control (MAC) Bridges.

(List continued on next page.)

Primary Examiner—Dung C. Dinh
Assistant Examiner—Kevin Parton
(74) Attorney, Agent, or Firm—John Black; Kenneth A. Seaman

(57) ABSTRACT

A data processing network having at least one centrally accessed computer connected to a plurality of PC Client computers of various types containing myriad "content", defined as any type of multimedia, program and OS elements, files or text and voice and video messages located in accessible storage, the centrally accessed computer having content management software and a database containing one copy of each content element unique to one PC Client and one copy of each content element common to a plurality of PC Client computers, each PC Client computer containing a software agent and numerous content elements in local accessed storage. A method and means for maintaining one copy of each common content element and one copy of each unique content element, stored in the database of the centrally accessed computer and for refreshing the contents of the PC Client computers as required from the database and network resources.

23 Claims, 10 Drawing Sheets

OTHER PUBLICATIONS

Ucone White Paper, Feb. 1, 2000, pp1–12 Zapwerk, Inc.

Strategy Profile, Jun. 9, 2000, pp. 1–8 Pretzel Logic Software, Inc., Aberdeen Group.

"Comprehensive Data Protection for Laptop and DeskTop Client Computers" Hewlett Packard Corporation May 5, 1999, pp. 1–8.

On–Line Data Backup for Personal Computers and Laptops @Backup, Inc, 1998, pp. 1–12.

* cited by examiner

ELEMENTS OF PC CLIENT MAP

PC CLIENT MAP CONTENTS

| HASH | LOCAL NAME & LOCATION | S | R | EXP. DATE | USE ALLOW | TIME | DATE | KEY |
|------|----------------------|---|---|-----------|-----------|------|------------|-----|
| 0ADF | \\RAEC\BIOS\ACPI Parameters | U | r/w | 12/31/9999 | 99999999 | FA3C | 10/12/1999 | - |
| CD01 | \\RAEC\C:\config.sys | U | r/w | 12/31/9999 | 99999999 | 1C | 5/24/2000 | - |
| F425 | \\RAEC\C:\WINDOWS\SYSTEM\security.dat | U | r/w | 12/31/9999 | 99999999 | 1C | 5/24/2000 | - |
| 1000 | \\RAEC\PCI\ENUMERATOR\DEV0 | U | r | 12/31/9999 | 99999999 | FA3C | 10/12/1999 | - |
| 4C68 | \\RAEC\C:\IO.SYS | C | r | 12/31/9999 | 99999999 | 1C | 10/12/1999 | - |

ELEMENTS OF PC CLIENT MAP

FIG. 5

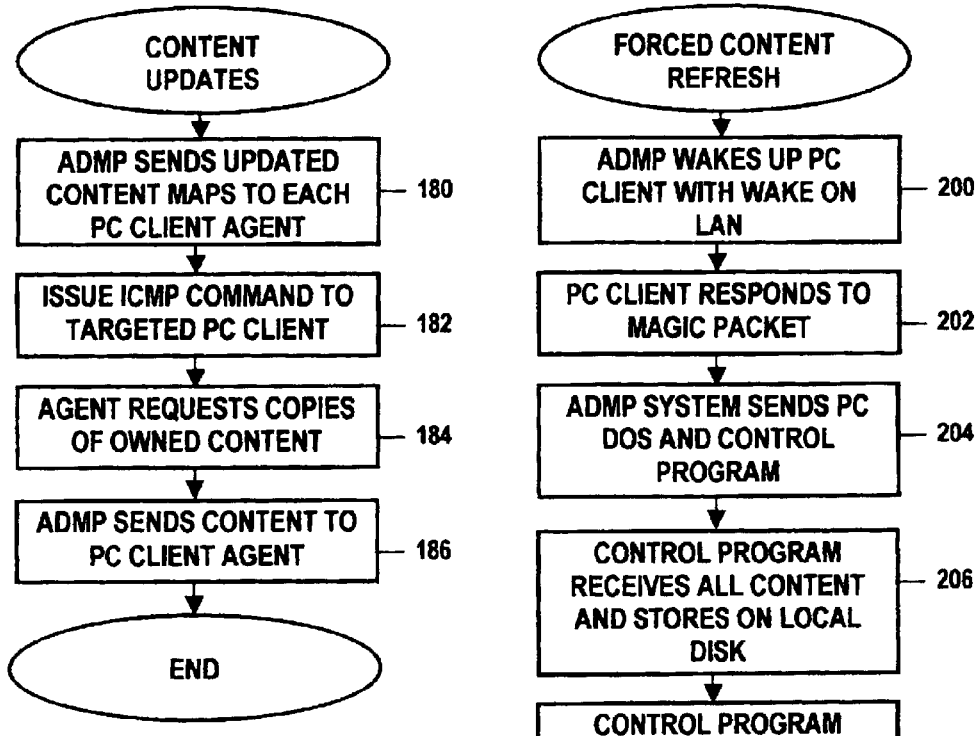
FIG. 10
FIG. 12
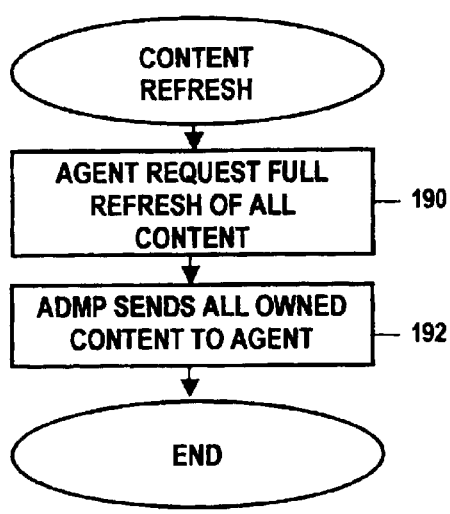
FIG. 11

CONTENT MANAGEMENT AND SHARING

BACKGROUND OF THE INVENTION

1. Field of the Invention

This invention relates generally to a Personal Computer (PC) Client based, directly connected network with PC Clients containing various soft yet unique contents and with PC Clients containing soft contents common to the other PC Clients, providing automatic content management for the purpose of efficient, transparent distribution and sharing, which reduces time consuming and costly labor to effect, disseminate, and manage over an entire network without loss and with the efficient replication of said content at a central site (PC Client or Server) without involving the typical server 10 process, using direct data transfers among the PC Clients and a Management Program that resides on a computer in the accessible network.

2. Historic Perspective of Invention

With the proliferation of the Transmission Control Protocol/Internet Protocol (TCP/IP) based networks in the 1990s, many local area networks were configured from the server and required Information Technology (IT) manpower to visit a PC Client (referred to herein simply as a PC Client) to initialize and identify the PC Client for network operations. Typical initialization routines involve inserting into the PC Client a floppy diskette media with appropriate network drivers and network operating system parameters. After the initialization from the floppy based media and resulting identification from server, the PC Client would be able to communicate to the network server and also be capable of communications with other network resources, given the appropriate access rights. This process is manual in that a network savvy IT person must perform the operation thus ensuring the PC Client can be identified by the server with an unique IP address. For each PC Client, network server resources are identified and assigned either by explicit enunciation of server resources and shares or by implicit membership of that PC Client in a group definition, as defined by the Network operating system of the network server, which group definition contains resource and share access permissions.

An IP address, that which uniquely identifies each PC Client on the network, is assigned either at the network server or at the PC Client. This process must be performed for each network server that offers resources to the PC Client.

Each individual PC Client is manually initialized and assigned an IP address, thus enabling it to use a server and the server's resources, using a floppy disk that is inserted into the PC Client. The floppy disk normally contains the appropriate drivers, configuration information from the Network Operating System, and miscellaneous files that assist in the final preparation that enables the utilization of the server and it's resources. The server acknowledges the IP address that each PC Client is using. Consequently, the PC Client can access server resources and shares.

Multiple PC Clients are initialized and prepared for server use, with each PC Client requiring the equivalent manual effort. In some cases, an agent may be installed onto each PC Client. The agent performs a limited inventory of installed known applications, which at this process stage are generally the basic applications that are necessary to operate the PC Client. Further manual effort may be required to install other applications from server shares, as is customary in today's Local Area Network (LAN) environment.

The IP address, a 32 bit binary number, is comprised of four (4) segments or classes, with each class having a value that ranges from zero to 255 decimal (zero is significant). TCP/IP. The total number of unique addresses on a local area network is 4,294,967,296 (256×256×256×256). For Local Area Networks (LANs), the total available number of IP addresses is not significant. As a side note when referencing the Internet, the limited 32 bit address is quickly becoming a problem as more and more computers become connected to the Internet via Wide Area Networks (WANs).

There are two methods of assigning an IP address to a PC Client. In one method, a server dynamically assigns the IP address to the PC Client as needed. Typically, the server would use software that functions as a Dynamic Name Server. In the other method, static addresses are assigned manually to each PC Client.

Once an IP address is assigned to a PC Client, typically the network server will associate a machine name to that the IP address. The machine name is normally unique to the PC Client computer. The machine name is effectively an abstraction, reference to the PC Client that is utilized by network operating systems and protocols.

In addition to the manual process of connecting the PC Client to each network server, the entire-focus of the identification process was to make available network services and resources to the PC Client. The collection and management of content on the PC Client is virtually ignored, even in today's advanced server operating systems for PC Clients. In other words, the process portends a one-way relationship with the network server and the PC Client, where the emphasis rests on the resources (including content) offered by the network server and not by the PC Client.

More importantly, content that is contained on the PC Client goes unnoticed, for the most part, by the network server. This is partly due to the nature of the network server as it executes it primary function: serve it's resources outward to PC Clients. Adding to the already complex nature of the network server is the current trend to add network servers to perform specific application function, thus making assignment of content management on the PC Client less applicable to any one specific network server. As it has been in the past, only those PC Clients with a need to access the server are given the access rights to the server. Consequently, a particular network server may not have any access rights to a given PC Client, given its primary function to serve an application specific task outward to a PC Client.

While various PC Client management software exist today, no known software packages exist that automatically manage the full content on the PC Client in a network as a collected and shared resource. IT organizations have little time to discover and learn about the content and its use on each PC Client, with the possible exception of the contents that were installed by their organization or came preinstalled by the PC Client manufacturer. With little or no knowledge of the content, and without a specific application or server to manage the content, PC Client content exists as long as the PC Client maintains it, thus emphasizing the placement of content management upon the user of the PC Client computer.

The Internet has increased the number and size of PC Client content by allowing each PC Client to download many different types of content, which are not visible to the network resource or to the management software that may or may not exist on any network server.

Considering that the majority of a company's corporate information may reside on individual PC Clients that do not share or timely protect transitions to that content, a great need exists to automate PC Client full content management without burdening the server process and resources, and to automate content sharing among other PC Clients as needed.

As network computing evolves, more emphasis will be placed on the PC Client, regardless of the network server. The delivery and management of content on the PC Client will become more important as the source for content that is used by the PC Client.

BRIEF SUMMARY OF THE INVENTION

A method and system for "automatically" and without manual intervention identifying PC Clients on a network, establishing a formal method of communications between the PC Clients, installing a PC Client agent software on the PC Clients, analyzing those PC Clients for common and unique content, making a copy of and reducing and or eliminating the redundant storage of PC Client content to and on a centrally accessed computer without loss; sharing the common content among PC Clients as well as for distributing new content to select PC Clients and groups, for maintaining redundant content maps that allow common content to be extracted from multiple sources and that manage content lock down lists that prohibit the accidental or intentional deletion or modification of content, and provide multiple sourced recovery of content, from the closest repository.

In a preferred embodiment, one of the PC Clients is designated the host PC Client with access to the server and all other PC Clients in a network, e.g. a LAN. The host PC Client is initialized in any of several ways, for example, from a diskette having the required host software programs stored therein. The host PC Client searches for and identifies and logs the server and all other PC Clients on the network by address and machine name.

The host PC Client sends Agent software to each PC Client. The Agent analyzes all of the content in each respective PC Client and prepares a local map of the soft content. The Agents send the maps for each respective PC Client to the host PC Client for comparison with entries in a master map of all soft content in the network. For all local map entries not found in the master map, the host PC Client software and the Agents prepare and send the corresponding PC Client content to a master database created and managed by the host PC Client software. One copy of each content element unique to a PC Client or common to several PC Clients is maintained in the master database.

The content management software in the host PC Client maintains the database along with the corresponding master content map. Changes to the master content map are sent to each affected Agent on PC Clients.

It will be understood that the network server rather than a PC Client could be designated as host, which then provides content management and communicates to Agents on the PC Clients. Also, the content stored by the server could also be replicated to the master database of the host PC Client and managed in the same manner as the content of the PC Clients.

BRIEF DESCRIPTION OF THE DRAWINGS

FIG. 5. Illustrates Local Map entries in a PC Client of the present invention.

FIG. 10. is a flow diagram illustrating content and map updates.

FIG. 11. is a flow diagram illustrating content refresh.

FIG. 12. is a flow diagram illustrating forced content refresh.

DETAILED DESCRIPTION OF THE INVENTION

Figure 1:
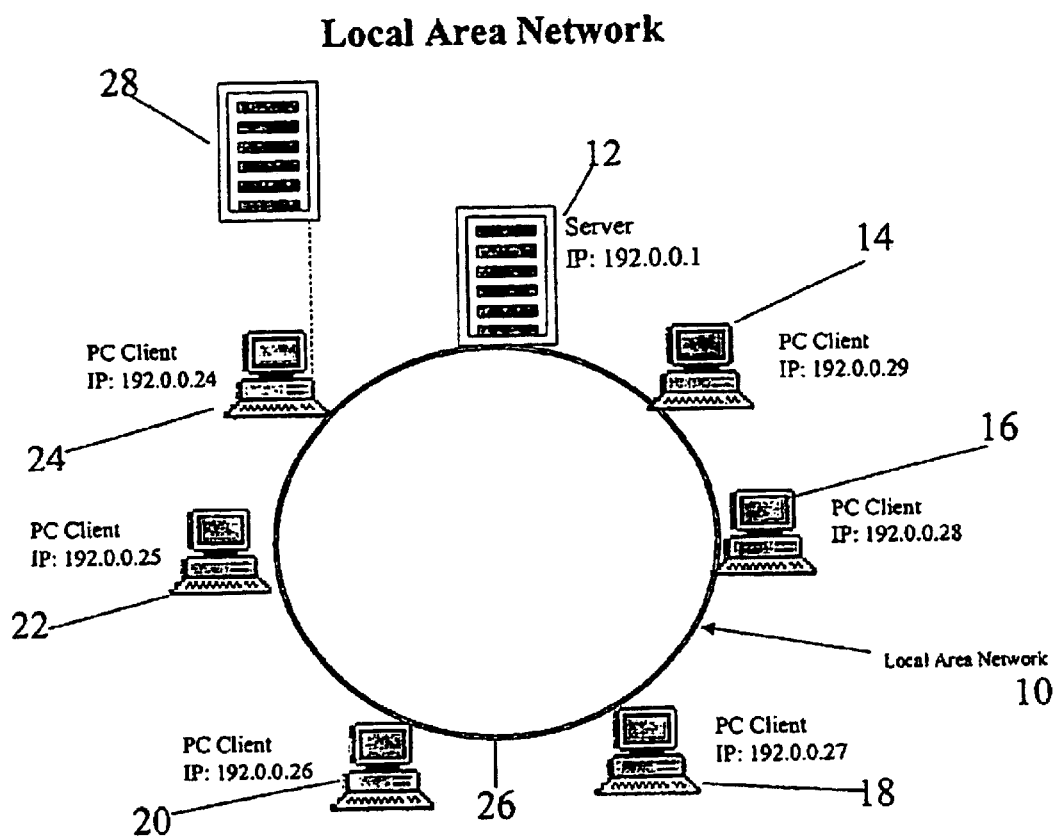
FIG. 1. Diagrammatically illustrates a conventional local area network (LAN) known in the prior art.

A typical prior art local area network (LAN) 10 is diagrammatically illustrated in FIG. 1. LAN 10 includes a server 12 and a plurality of PC Clients 14, 16, 18, 20, 22, and 24 connected to each other via a network communications path 26.

Figure 2:
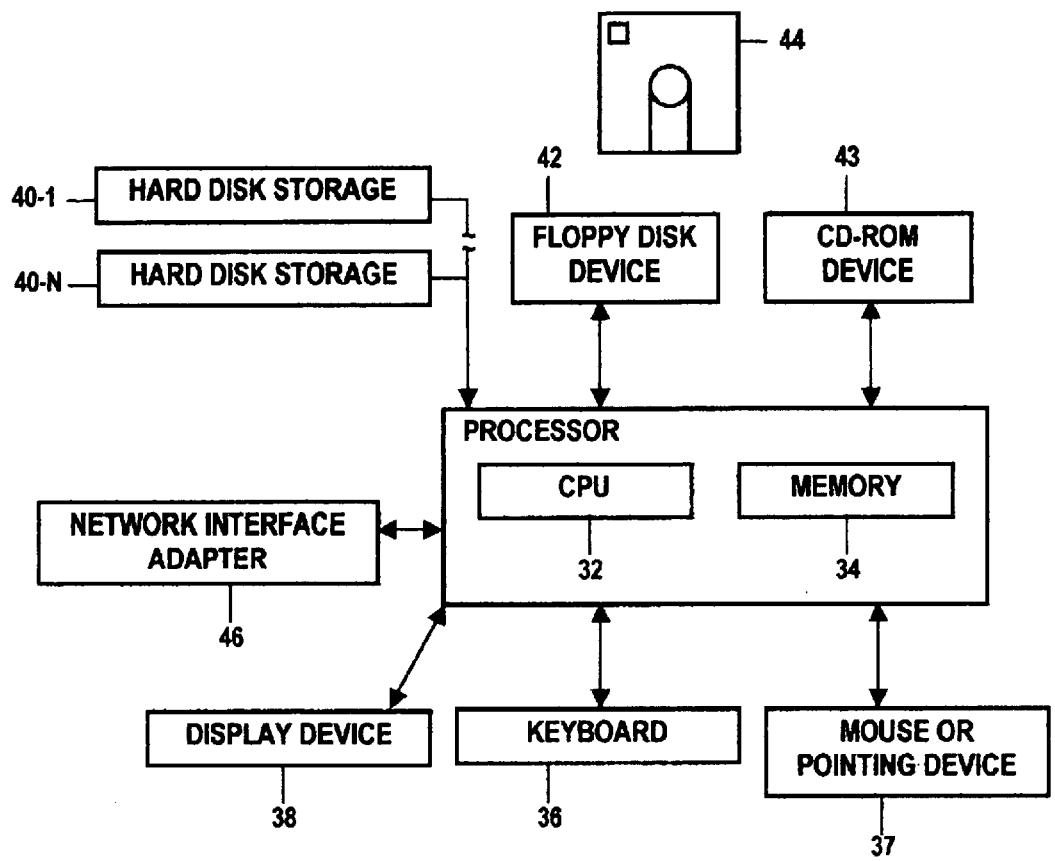
FIG. 2. Diagrammatically illustrates a conventional PC Client machine.

A typical PC Client 24 is diagrammatically illustrated in FIG. 2 and includes a processor 30 having a central processing unit 32 and main storage 34. A keyboard 36 and a display 38 and a mouse XX are coupled to the processor's natively attached peripheral bus (not shown). One or more disk storage units 40-1 to 40-n, a floppy disk device 42 adapted to receive floppy diskettes 44, and a CD-ROM reading device 43 are also coupled to the processor 30 via standard disk channel interfaces (not shown). Network Interface 46 is also coupled to the natively attached peripheral bus.

One example of a network in which the present invention can be used is shown in U.S. Pat. No. 5,913,028 issued Jun. 15, 1999 to the assignor herein and said patent is incorporated herein by reference as if fully set forth.

In a preferred embodiment of the invention, the PC Client 24 is designated to be the host PC Client; and program code on the diskette 44 is entered into the host PC Client 24 to initialize it as a centrally accessed computer. The diskette also includes the auto-discovery 62 and management program code 60and agent code 54 of the present invention, which code is also loaded into the host PC Client 24 during initialization. An IP address is illustrated in FIG. 1 for each PC Client and for the server 12.

Figure 3:
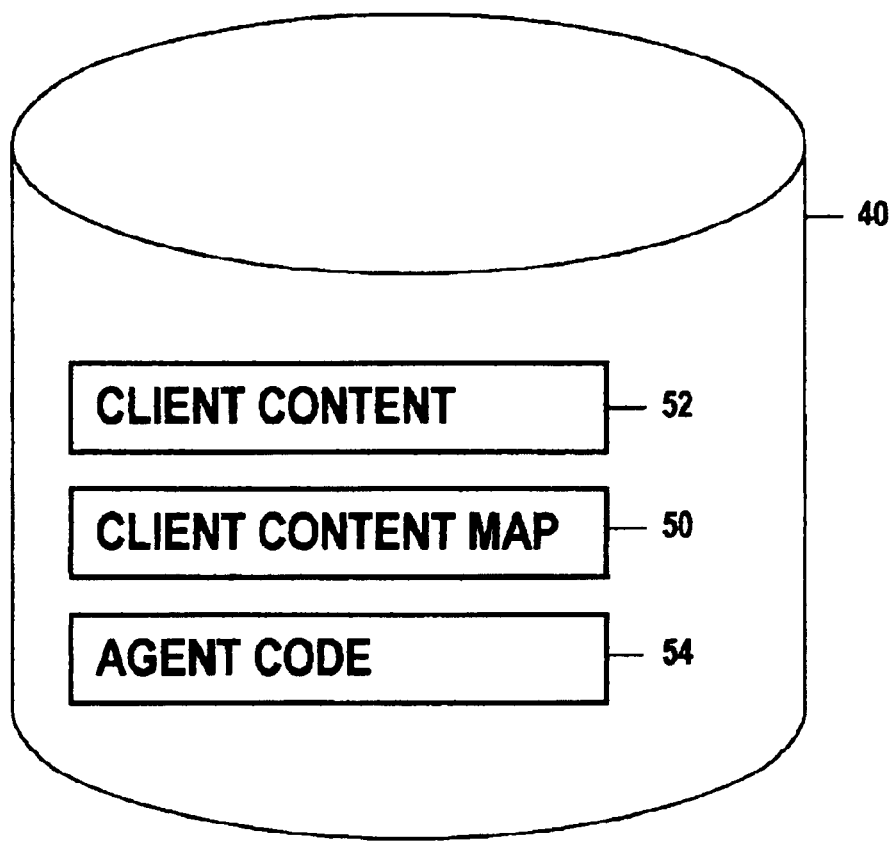
FIG. 3. Illustrates certain elements in the PC Client disk storage of the present invention.

The other PC Clients 14, 16, 18, 20, and 22 are also generally of the type shown in FIG. 2. FIG. 3 illustrates certain of the elements contained in the PC Client disk storage, corresponding to storage 40 of FIG. 2, which elements will be discussed below. The elements include a client map (part of the master map), client content 52 and agent code 54.

Figure 4:
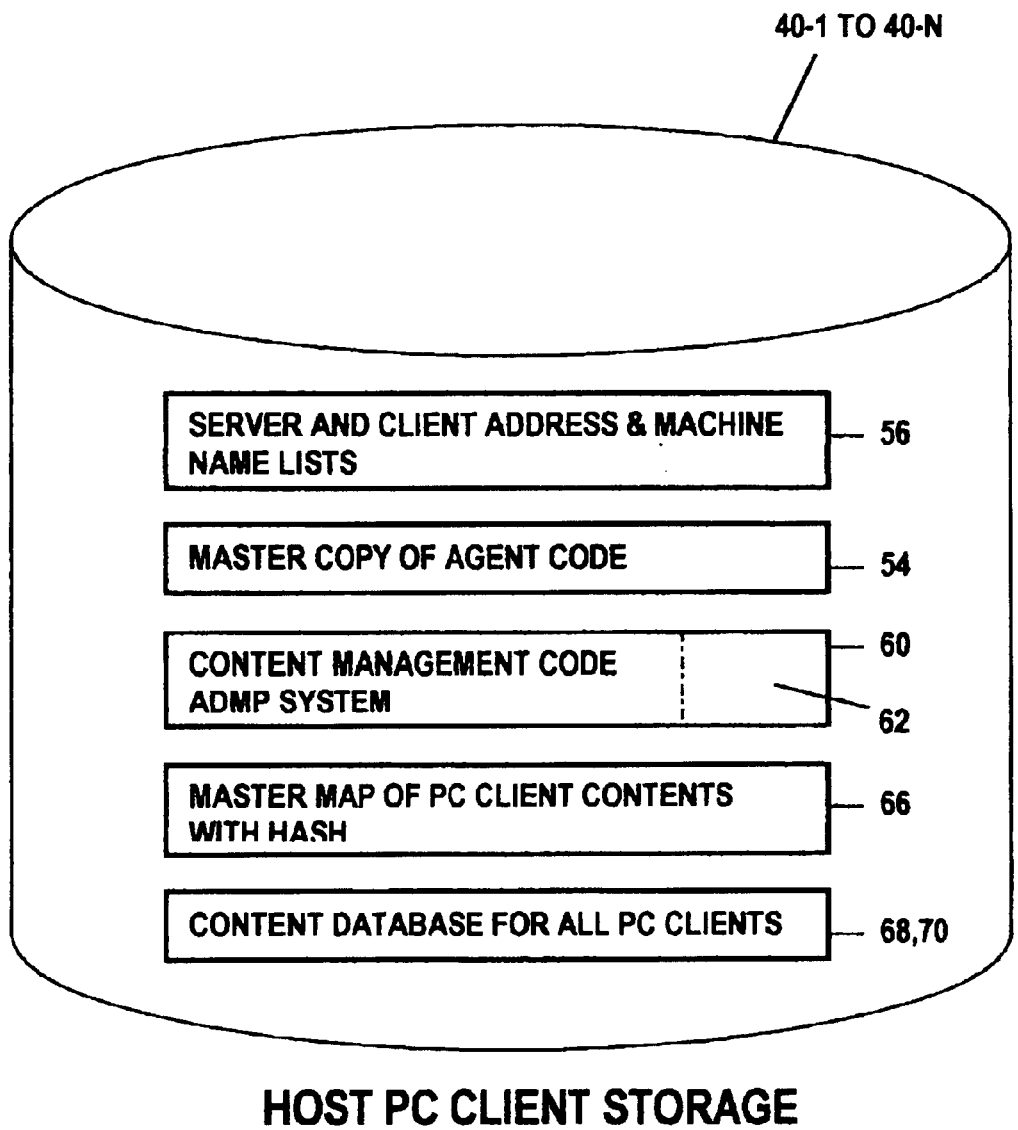
FIG. 4. Illustrates certain elements in the host PC Client of the present invention.

FIG. 4 illustrates certain of the information stored in the disk storage units 40-1 to 40-n of the host PC Client 24. The information includes a server and PC Client address and machine name list or log 56, client agent code 54, network content management software code 60 including auto-discovery code 62, a local client map (part of the master map), a master map 66 including content hash values, and a master content database including common content elements 68 and unique content elements 70.

Figure 6:
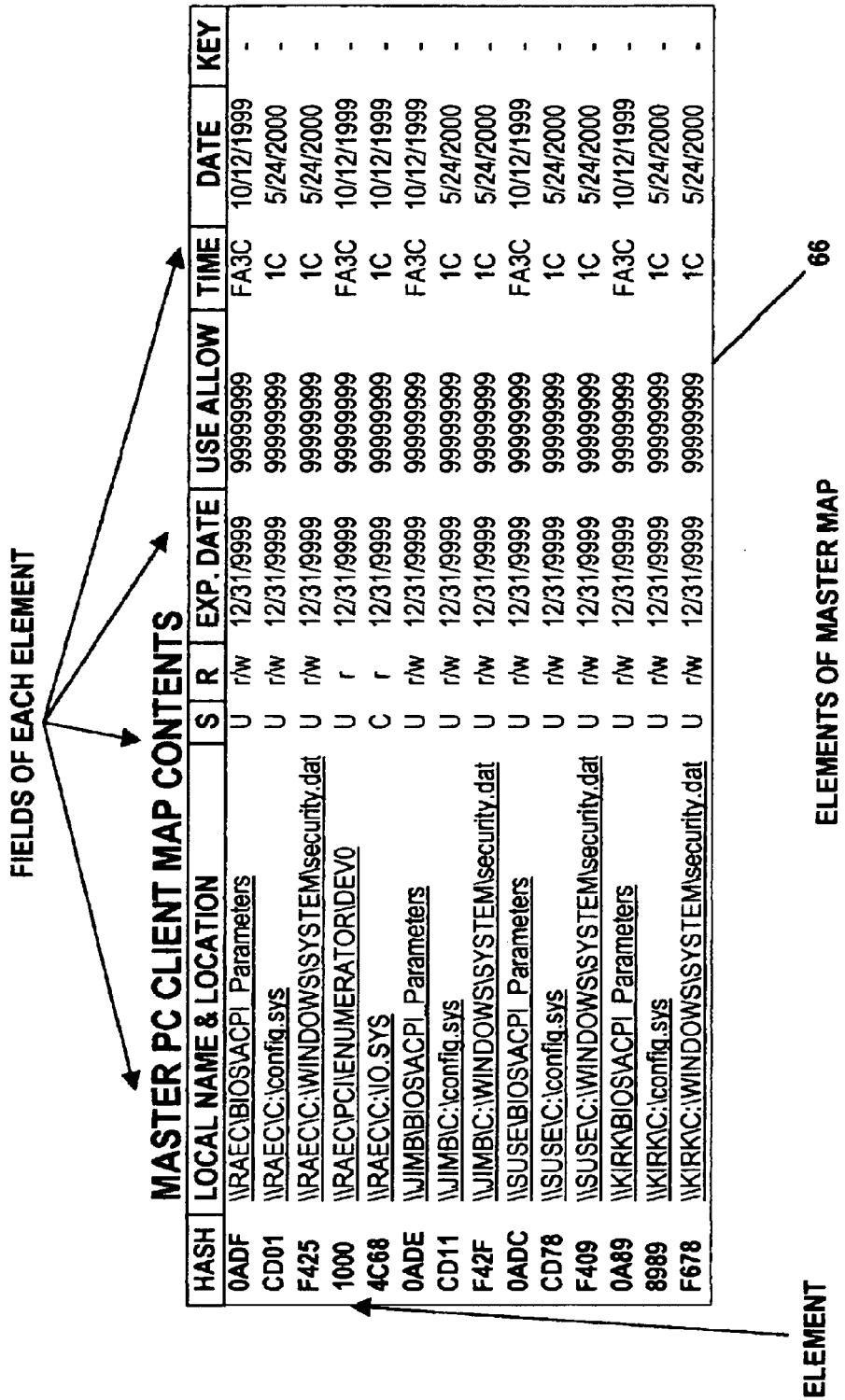
FIG. 6. Illustrates master map entries in a host PC Client of the present invention.

FIG. 6 illustrates entries in the PC Client local map such as map 50 of FIG. 3. The master map 66 of FIG. 6 contains the entries of all of the local maps 50.

The operation of the improved method and means of the present invention will now be described.

ADMP Control Over PC Clients

In a preferred embodiment, exercising Control over PC Clients is performed with the. ADMP system 60 by executing remote MICROSOFT WINDOWS® NT Security commands, by sending NetBIOS commands, and by executing Advanced Configuration and Power Interface (ACPI) commands. The process involves first determining if a PC Client is fully operational with NetBIOS status commands. If the PC Client is fully operational, then the ADMP system 60 uses NT security commands to instruct the PC Client to receive a remote program load of the PC Client agent 54. If the PC Client is not operating with the Microsoft Windows NT 4.x Operating System or with the Microsoft Windows 2000 Operating System, then the ADMP system 60 issues ACPI commands to force a reboot to the network of that PC Client. When the PC Client reboots to the network, the ADMP system 60 absorbs the network boot request from the PC Client, and sends an operating application to the PC Client. The operating application performs a boot strapping function by further downloading a full operating system and application to the PC Client's main memory 34. Then control is passed to that code, which receives the agent software and installs the agent software 54 onto the PC Client. The PC Client is then rebooted.

Additional Clarification for Searching in Linked Local Area Networks

The ADMP system 60 operates in a peer-to-peer fashion by seeking out IP addresses within a given subnet or class. In some cases, access to subnets, other than the native subnet of the host PC Client for the ADMP system, are accessed as well. Preferably using the teachings of U.S. Pat. No. 5,913,028, when targeted PC Clients on the other subnets are identified, the ADMP system communicates directly with those PC Clients via server network I/O devices, therefore bypassing the server planar board, memory, and independent of the server CPU. It is in this embodiment that it is said the ADMP system also operates in a peer-to-peer fashion and eliminates server resources from use.

Figure 7:
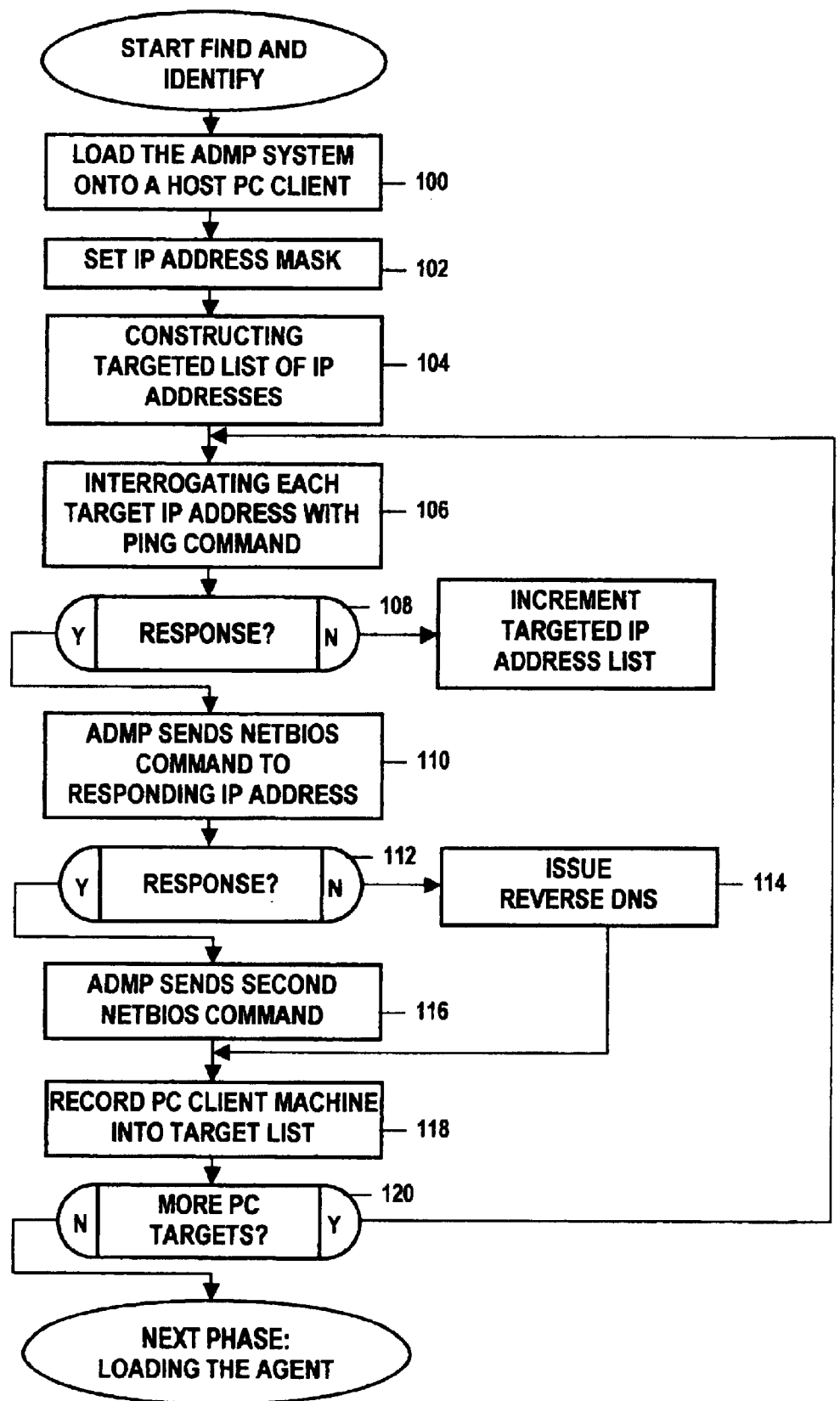
FIG. 7. Shows a flow diagram illustrating the improved method initiated by the host PC Client for identifying the server and PC Clients of the present invention.

Auto-Discovery and Management Program (ADMP) 60, 62 Executes on one PC Client Computer 24, a Centrally Accessed Computer, Finds All PC Client Computers 14-24, and Distributes Agent Software 54 to Each PC Client Computer Preferably as Illustrated in the Flowchart of FIG. 7.

The Auto-Discovery and Management Program (ADMP) 60 system is a software program that is loaded onto one PC Client computer 24 in the preferred embodiment (or server 12 computer) in the Local Area Network (LAN) 10. The ADMP 60 operates in a peer-to-peer mode and provides a sophisticated, stealth method of detecting and communicating with other Client PCs, which are connected in the same network. ADMP's peer-to-peer functionality includes an efficient scheme to eliminate the use of local server resources, thereby enhancing overall performance and efficiency of the network and reducing dependencies of a local server. As ADMP communicates directly over the network I/O channel; I/O (movement of data) becomes much more efficient without using a server's communications facility and layered I/O driver architecture, which can add significant overhead to any one transmission. The end results are that communications become significantly faster while fewer resources on the network are utilized and less bandwidth is required to effect functionality.

Step 1. Loading the ADMP System Onto a Hosted PC Client (block 106, FIG. 7)

This program can be loaded from one of five different methods: from CD-ROM or DVD-ROM media, from Floppy Disk media as seen in FIG. 2, from a pre-installed hard drive, from the Internet, and from a local server.

Step 2. Set IP Address Mask (block 102)

Once the ADMP system 60 is loaded, its auto-discovery routine 62 can be directed to find all PC Clients in the directly attached local area network 10. In a preferred embodiment, the program uses the host PC Client's IP address as the basis for a mask, which will define the scope of IP addresses in use.

Typically, a subnet range will utilize the last class of the IP address, e.g. 255.255.255.XXX where XXX is the subnet range of IP addresses. Additionally, multiple subnets may be identified and used to access other LANs that exist via connections from attached routers and hubs. The mask is constructed from the four segments (or classes) of the IP address. In table 1, the IP address is 192.0.0.24. A mask specifies the class full IP address pattern that the subnet calculation can be achieved. The ADMP system provides the enhanced operation of addressing multiple LANs that use the same leading IP classes or segments and those that use different leading IP classes, as represented by the embodiment of U.S. Pat. No. 5,913,028.

The first subnet is calculated with a mask of 255.255.255.1. Along with the mask, the ADMP system starts PC Client detection with "1" in the fourth segment, e.g. 192.0.0.1, increments by the number one (1), and progresses to 254, thus encompassing one entire subnet of the local area network. Addresses "0" and "255" are reserved for network broadcasting. This process is repeated for every address using the masks of "255.255.255.1"; "255.255.0.1", "255.0.0.1" and "0.0.0.1". The resulting targeted IP addresses form a targeted list of IP addresses in the manner identified in Table 1.

The ADMP system 60 calculates the first subnet by using a mask of 255.255.255.1 relative to the given IP address of the host PC Client, e.g. 192.0.0.XXX. The resulting range of IP addresses is therefore 254 starting with. 192.0.0.1 and ending with 192.0.0.254.

TABLE 1

Constructing the Targeted IP Address List

| | | |
|---|---|---|
| Target 1: | Initial Address | 192.0.0.1 |
| Target 2: | Add 1 to 192.0.0.1 | 192.0.0.2 |
| Target 3: | Add 1 to 192.0.0.2 | 192.0.0.3 |
| ... | ... | ... |
| ... | ... | ... |
| ... | ... | ... |
| Target 254: | Add 1 to 192.0.0.253 | 192.0.0.254 |
| Next Mask of 255.255.0.0 | | |
| Target 1: | Initial Address | 192.0.1.1 |
| Target 2: | Add 1 to 192.0.1.1 | 192.0.1.2 |
| Target 3: | Add 1 to 192.0.1.2 | 192.0.1.3 |
| ... | ... | ... |
| ... | ... | ... |
| ... | ... | ... |
| Target 255: | Add 1 to 192.0.1.253 | 192.0.1.254 |

Step 3. Constructing the Targeted List of IP Addresses (block 104 FIG. 7)

The ADMP system 60 then calculates the next set of IP addresses using a mask that opens the next class, e.g.

255.255.X.Y where the X represents a set of numbers with each having up to 254 potential IP addresses or Y. And in sequence, the next level or class of IP addresses by further specifying a lower value in the mask, e.g. 255.0.0.1. And in summary, the entire range of IP addresses possible can be calculated and sequenced into a list of targeted IP addresses that contain entire subnets, which point to all possible nodes on a LAN, as well as multiple LANs with different class subnets but physically connected.

Step 4. Interrogating Each Targeted IP Address (blocks 106–120, FIG. 7)

The ADMP system 60 issues a set of low-level protocol commands to each generated IP address. The first command is an Internet Control Message Protocol (ICMP) command named Ping, which requests data from the targeted address.

Step 5. No Response From Targeted IP Address Results in Increment of List

If the targeted IP address does not respond to the command, then the ADMP system marks this IP address with a no response indicator, increments the IP address, as noted in the list, and resumes with the next IP address as in Step 4.

Step 6. ADMP System Sends NetBIOS Command to Responding IP Address (block 110)

If the targeted IP address returns a response (block 108), then the next command is a first NetBIOS Status command that returns, among other data, the machine name. The machine name is an alphanumeric string of up to 15 characters. [Although the machine name may be longer than 15 characters, preferably only the first 15 characters are used.] The machine name follows the conventions of the NetBIOS Name Service Resource Record as defined in the NetBIOS specification. In addition to the machine name, a manufacturer's serial number and status code are returned in the same NetBIOS command. The serial number and status code are used to determine whether the machine is fully operational or may require a "full content load".

Step 7. No Valid Response From Targeted IP Address (block 112)

If the targeted IP address does not return NetBIOS status information indicating the machine name, serial number and operational status of the PC Client, then a reversed Domain Name Server (DNS) lookup block 114 is issued to retrieve the machine name.

If the targeted IP address does not return an acceptable response to the Ping, then that targeted IP address is marked with a no response indicator for the NetBIOS command, the IP address is incremented, and the ADMP system resumes at Step 4.

Step 8. ADMP System Records Responding PC Client

A second NetBIOS command is issued block 116 to all those IP addresses that responded with a machine name. The second command interrogates each PC Client for Advanced Configuration and Power Interface (ACPI) status and support. Once all targeted IP addresses have been interrogated, a final list of PC Clients with their IP addresses, machine names, and ACPI status is compiled. Some of the compiled PC Clients may actually be servers and printers; those computers are marked accordingly in the final list. For those PC Clients that returned a manufacturer's serial number and operational status that indicated "full content load necessary", a second list, Full Content Load, is constructed.

For those PC Clients that returned a manufacturer's serial number and an operational status code of "full content load necessary", the ADMP system 60 will maintain a list of PC Clients that require a full content load. Upon reaching Step 18, the full content load will be effected.

Loading the PC Client Agent Onto Each PC Client

Figure 8:
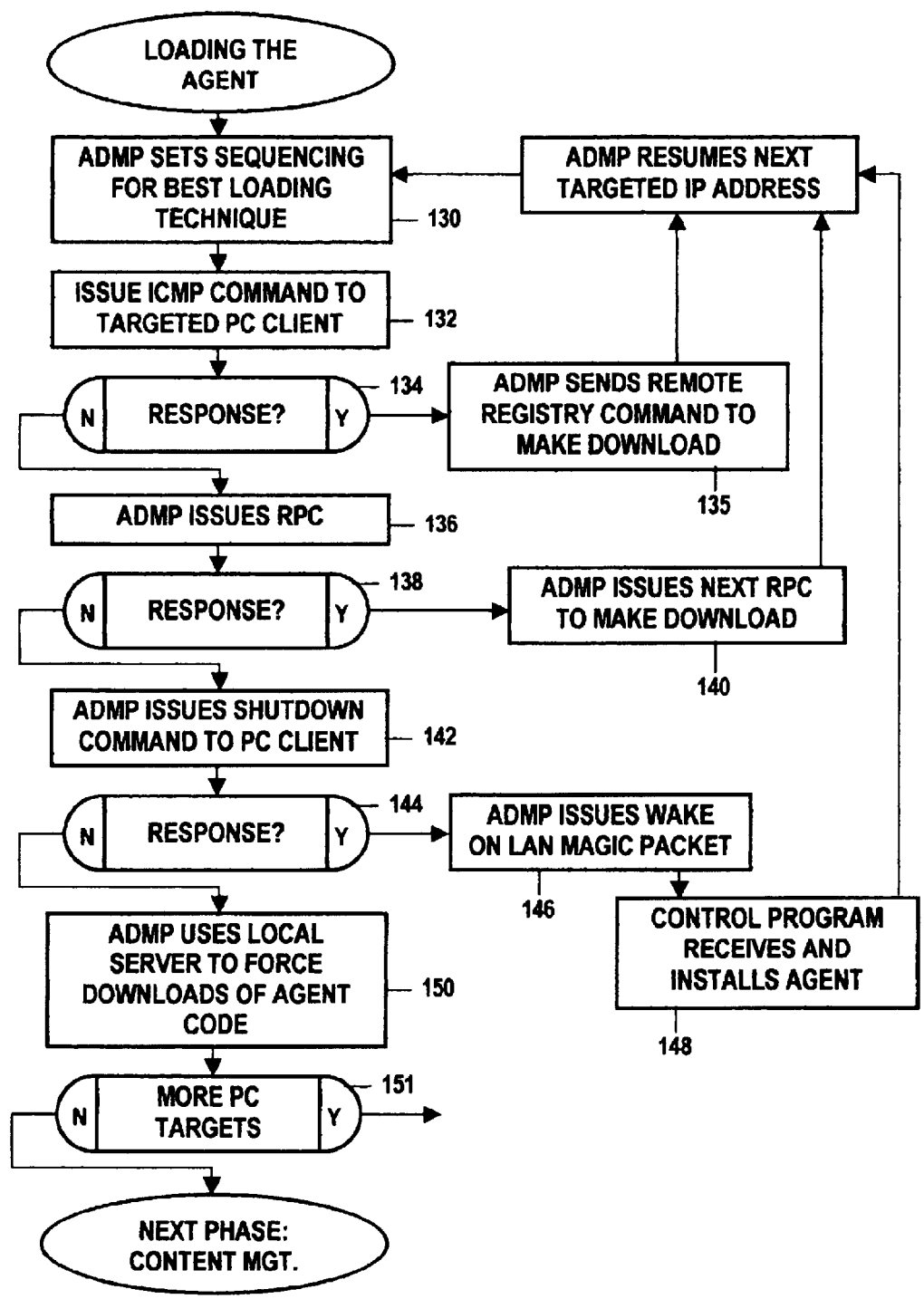
FIG. 8. is a flow diagram illustrating the loading of the PC Client Agent onto the PC Client machines.

Step 9. Setup the Sequencing for Best Loading of Client Agent Software (block 130, FIG. 8)

The ADMP system 60 sequentially utilizes one or more methods for distributing PC Client Agent code 54 to each PC Client. The host PC Client, the resident machine of the running ADMP system, must have network administrative privileges, if a network exists, to execute some of the known methods that install the agent code on each PC Client. Network administrative privileges enable the ADMP system to issue protected commands over the network. These commands typically are reserved for administrative personnel that manage a network and are historically facilitated by a server operating system. In this invention, the ADMP system facilitates the actions of the commands while each PC Client reacts or executes the necessary steps to complete the commands.

The detection of the best process involves sequencing through several inquiry methods that are based on the host PC Client, i.e. the PC Client or Server that hosts the execution of the ADMP system.

Each PC Client operation may be scheduled, based on a number of factors including but not limited to network loading, time of day, day of the month, and year.

The first method determines if targeted PC Clients permit remote registry modification. The second method determines if a Dynamic Host Configuration Protocol (DHCP) service with logon scripting is operating on the network. The third method determines if the PC Client supports Remote Procedure Calls. Once the best method is identified, as determined by the sequential process, that method is used to install the Agent code onto each. PC Client.

Step 10. Issue ICMP Command to Targeted PC Client (block 132)

If the install operation was previously scheduled, the ADMP system starts (at the previously set time and date or network loading condition) a sequence on each IP address and Machine Name. An ICMP command is sent to a targeted IP address of the PC Client. This command instructs the PC Client to receive a remote registry command that modifies the registry on the PC Client.

Step 11. Targeted PC Client Responds to ICMP Remote Registry Command (block 134, 136, 138)

If the PC Client responds, then the ADMP sends a remote registry command that instructs the PC Client to access a download and execute a file on the ADMP. The file contains the PC Client Agent installation code. Once the installation code is installed and executing, communications between the ADMP and the PC Client is completely set up. The ADMP system resumes at Step 9 for the next targeted IP address or PC Client.

Step 12. ADMP System Issues RPC Command (block 136)

If the remote registry command is not successful, then the ADMP issues a remote procedure command-(RPC). The command tells the targeted PC Client to respond to remote procedure commands.

Step 13. Targeted PC Client Responds to RPC Command (block 138, 140)

If the PC Client responds to the RPC command, then another command is transmitted to the PC Client that instructs the PC Client to receive the installable PC Client Agent program. Once received, the PC Client executes the installable PC Client Agent program, which installs and executes itself and communicates back to the ADMP system. The ADMP system resumes at Step 9 for the next PC Client.

Step 14. ADMP System Issues Shutdown Command (block 142)

If the Remote Procedure Command is not successful, the ADMP system sends out an Advanced Configuration and Power Interface (ACPI) or Windows OS security shut down command message that is encapsulated in a TCP packet. The shutdown command instructs the PC Client to power down.

Step 15. ADMP System Issues a Wake On LAN "Magic Packet" (block 144, 146)

The ADMP system waits for 5 minutes and then issues a known "Magic Packet", which tells the PC Client to power up and boot off the network. When the PC Client powers up, it attempts to boot off the network by sending out a request for a network boot. The ADMP system intercepts that request and forwards a special boot image to the PC Client. The PC Client receives the image and executes it. The special boot image is a software program that continues the remote process communications and requests a full functioning PC DOS (or other executable runtime system) image along with a control program that performs communications and storage I/O.

Step 16. Control Program on PC Client Receives and Installs Agent Installation Code (block 148)

Once the PC Client has received the control program, the control program takes control of the PC Client and requests a copy of the Agent installation code. This control program then stores the Agent code on the local PC Client and reboots the system. Once the PC Client reboots, the Agent installation code executes and installs an operating copy of the Agent locally. The ADMP system resumes from Step 9 for the next PC Client target.

Step 17. ADMP System Uses a Local Server to Install Agent Code (block 150)

If the shutdown and restore operation is not successful, the ADMP system attempts to access the server and the logon scripts for the IP and machine name of the PC Client. If the ADMP is able to find a server, it issues a command to change the logon scripts to include the execution of the PC Client agent installation code, which resides on the ADMP system. The next logon event for that PC Client will force the execution of the PC Client agent installation code, and the PC Client agent will communicate with the ADMP system. The ADMP system resumes with the next targeted PC Client at Step 9.

Agents on Each PC Client Communicate to ADMP System

Once installed, the Agent code 54 initially broadcasts to the ADMP system 60 a packet of information that simply indicates that the PC Client is alive. The ADMP system logs the incoming packet and compares the machine name and IP address of the sending PC Client and updates it's list of machine names and IP addresses. If the IP address of the PC Client has changed, the ADMP system 60 updates it's list with the new IP address. In a system with leased IP addresses, this operation may happen quite often, or even daily. Whenever the PC Client detects a change in its IP address, it transmits that change to the ADMP system.

Content Inventory on Each PC Client is Accumulated at a Designated Location

Figure 9:
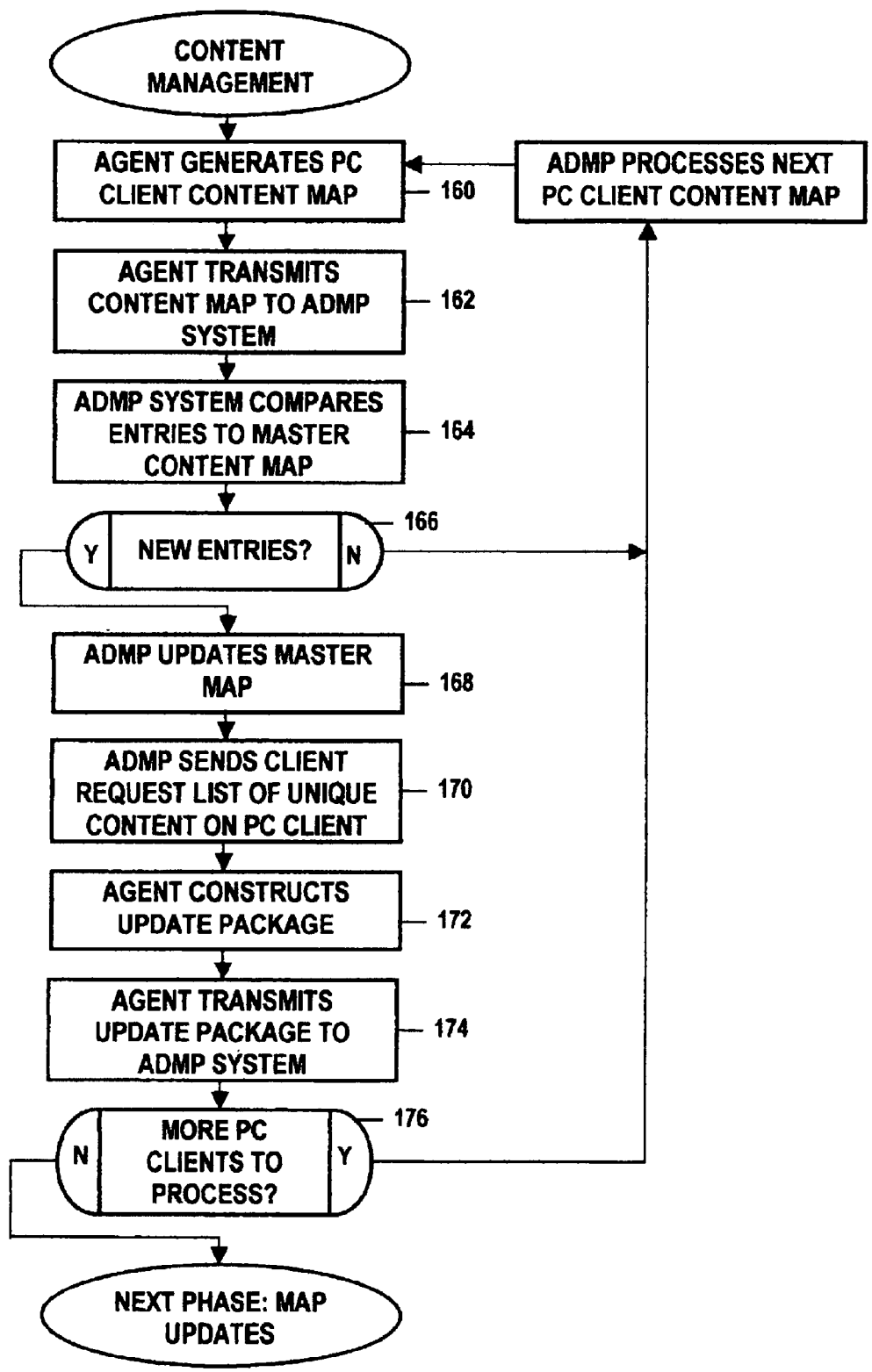
FIG. 9. is a flow diagram illustrating the creation of local PC Client content maps and a host PC Client master map of content.

Step 18. Agent Generates PC Client Content Map (block 160, FIG. 9)

The Agent's next operation involves determining local content and constructing a formal list of all content resident on the PC Client. Three record types will fully describe the entire contents of a PC Client: header record, hard content, and soft content.

The Agent code 54 scans the resident PC Client for the different types of content, as identified in Table 2.

TABLE 2

| Various Types of Content |
| --- |
| All Multimedia Content |
| All Messages |
| All Files |
| All Operating System Elements |
| All Application Elements |
| Hardware Installed |
| Revision Level of Hardware Installed |
| BIOS Versioning and Parameters |

A header record uniquely identifies each PC Client with the IP address, machine name, manufacturer's serial number and appropriate date codes.

For the hard elements, manufacturer's serial number (if available), version and revision levels, product name, system resources in use, and type of hard elements are fields of this record.

For the soft content elements (those elements that are not hardware), the Agent code constructs a local PC Client map 50 (Figure 50) having element entries that show each item inventoried, it's location, status, modification rights, expiration date, number of times allowed for use, amount of time used, date deployed, encrypted license key, and a 32-bit hash of the element. One field is used for identifying where the content element is located on the PC Client. Another field indicates whether the content is common with one or more other PC Clients or unique to one PC Client. Typically, this field is modified by the ADMP system only and refers to a master database that the ADMP maintains on behalf of all PC Clients. The status field shows the current status of the content elements. The modification rights field indicates whether the PC Client may modify the content; preferably, this field is set by the ADMP system. The expiration date has the date and time of when the content will expire. The times use field denotes the number of times that the content may be used by the local PC Client. The amount of time used is a field that records amount of time used for that content. The deployment date and time indicate when the PC Client received the content. The encrypted license key is a licensing code that allows the PC Client to use the content.

In a preferred embodiment, each soft element entry or record contains a hash that is calculated using a standard polynomial algorithm. The algorithm processes every byte of the element; the end result is a 32-bit number that uniquely identifies that soft element. The ADMP system maintains a master database 68, 70 that holds all content, whether unique or common. The hash that is contained in the content element record serves a dual purpose. Firstly, the hash uniquely identifies each content element; secondly, the hash is used an index to the master database of all contents.

Initiating and Completing Full Content Load—First Time

Step 19. Agent Transmits Content Map to ADMP system/Machine (block 162, FIG. 9)

Initially, the PC Client Agent transmits the local PC Client map to the ADMP system. After the initial event, the PC Client Agent will transmit updates to the ADMP at regular intervals, to be determined by settings in the ADMP management console.

Step 20. ADMP System Compares Entries to Master Content Map (block 164, FIG. 9)

The ADMP system 60 receives the PC Client content map and compares each entry to entries in a master map 66 of the master database 68, 70 of content. The hash value of each entry is compared with the hash values in the master map. For each entry in the sending PC Client's Content map that does not exist in the master map 66, the ADMP system 60 generates a request item in a temporary list that will be sent back to the sending PC Client.

The ADMP system compares each entry of the PC Client's map to the master map 66 of content residing on all PC Clients. The ADMP system dynamically creates the master database from the resident local content of the ADMP host itself and from all other PC Clients as each PC Client sends unique contents to the ADMP system. The ADMP system dynamically updates the master map as all other PC Clients submit their initial content maps or changed content maps.

Step 21. ADMP Updates Master Map to Identify Unique Content (block 166, FIG. 9)

The Master Map 66 represents all content across all PC Clients. The ADMP system stores entries contained in the Master Map, an accessible database. Only the hash values are searched and compared. ADMP system creates exception list of content not contained in master map as described above. Content that is identified as unique to a specific PC Client exists for that PC Client only; no other PC Client can receive that content. One copy of each content element is stored in the master database 68, 70, regardless of the number of PC Clients that may have that same element locally. One copy of an element entry exists in the master map 56 for each PC Client that has that content element; however, the content itself is not duplicated.

Step 22. ADMP System Transmits Request List of Content Back to Appropriate PC Client (block 168)

Once the ADMP system 60 makes a comparison of all hash values in the sending PC Client's map with the master map 66, the ADMP system identifies missing content elements by constructing a request list of those missing elements, sends the request element list, i.e. the exception list, to the PC Client, and the ADMP system updates the Master Map to indicate unique content for that PC Client.

Step 23. PC Client Constructs Update Package of All Exception List Content Elements (block 170)

The PC Client agent will then construct an incremental package of all content elements requested by the ADMP system, preferably compressing each element using an advanced version of a "Lempel-Ziv 77" data reduction algorithm.

Step 24. PC Client Transmits Update Package to Master Data Base 70; Data Base is Updated (block 172)

The PC Client transmits the Update Package to the designated location of the master database, which contains all content, both common and unique.

Step 25. ADMP System Repeats Steps 18 Through 24 Until All PC Clients Have Been Analyzed and Inventoried The ADMP system repeats this effort for all PC Clients, and repeats this effort when new content arrives at a PC Client or when a PC Client changes or deletes content and informs the ADMP system.

In each map, a special field denotes whether content is unique to one PC Client or common among more than one PC Client. The ADMP system stores one copy in the database of all contents, even if more than one PC Client has ownership. Unique content is proprietary to that PC Client and may only be used by that PC Client. Unique content may be changed to common content should another PC Client have that same content or should the content be delivered by ADMP system, such as the case where a full content load is required or when a service provider elects to send new content to the PC Clients.

Step 26. ADMP Transmits Updated Maps to All Registered PC Clients (block 180, FIG. 10)

The ADMP system 60 periodically transmits updated Content Maps to each known PC Client with an installed agent 54. The process involves the PC Client agent interrogating the ADMP system for updates. If updates exist, the PC Client requests those updates or signals that the PC Client is ready to receive the updates. In some cases, the process of actually sending updates will be scheduled; the PC Client agent will be prepared for these updates thereafter. In this way, each PC Client will know of new content that has been added or updated to the master list and whether content previously considered unique has been upgraded to "common" content status. Once content has been upgraded to common status, it no longer necessary for any one PC Client to transmit that content back to the ADMP system. The ADMP system 60 may add content that is to be distributed to all or some PC Clients. When new content is added to the ADMP system and a PC Client does not contain that content, the PC Client agent will request that content from the ADMP system.

Step 27. PC Client Agent 54 Updates Local Map to Indicate Changed Content (block 182)

Each PC Client will update its local map to reflect the current status of content that is contained in the master map as managed by the ADMP system.

The host computer 24 transmits all content of a PC Client to said PC Client for full recovery Step 28. PC Clients can Request Copies of any Content That is Owned or Licensed to PC Client From any Source Available in an Emergency (blocks 184, 186)

Upon request from the PC Client agent code or from the ADMP system, any part or all of the content associated with a PC Client may be refreshed from the ADMP system. Typically, this operation is an event triggered by the accidental or negligent deletion or destruction of content by a user or wanton software program on the PC Client.

Step 29. PC Client Requests Full Refresh of All Content (blocks 190, 192, FIG. 11)

The PC Client may have all content refreshed in two distinct methods: Agent initiated or by default boot request. The ADMP system will review the list of PC Clients that requested or require a full content load. Those PC Clients that request a full content load will be treated the same as those needing the initial content load, with the exception that a refresh of content is performed with elements extracted from the master database 68, 70 of content while the initial load is performed with a combination of both the master database 68, 70 and an internet portal server 28 that contains a master database of content as constructed by the manufacturer of that PC Client.

Step 30. PC Client Requires a Full Content Load (blocks 200-208, FIG. 12)

If the PC Client requests a boot from the network 10, the ADMP system will retrieve, either from the master database 68, 70 or from an Internet portal server 28 with a master content database as created by the PC manufacturer, a content map (a list of all content that should be resident on that PC Client) that is specifically associated with that PC Client. Once the ADMP system communicates with the Database server portal and receives a predefined content map for that PC Client as indicated by the manufacturer's serial number, the ADMP resolves local availability of all needed content. If some content is not available locally, then the ADMP system retrieves the missing content from the Internet portal server 28 that has a master database for that manufacturer, and then constructs a complete content package. Copies of all content are stored in a locally accessible master database for later use. Initially, a flag that indicates whether the content is unique to a specific PC Client or common among two or more PC Clients identifies each content element. All content is stored once in the database.

The ADMP system sequentially issues a "Wake on LAN" packet (block 200, FIG. 13) to each PC Client in the Full Content Load list. The ADMP system intercepts that request (block 202) and forwards a special boot image to the PC Client (block 204). The PC Client receives the image and executes it. The special boot image is an executable program load module, a software program that continues the remote process communications and includes a full functioning Disk Operating System (DOS) image along with a control program that performs communications and storage I/O.

The executable program load module formats the hard disk drive according to the parameters that were identified in the complete content package. Next, the module retrieves and places on the hard drive, the complete content package, which was stored in a database as described above (block 206). After placing the entire content on the hard drive, the module forces a hard reset and cold boot of the PC Client (block 208). Once the PC Client re-boots, the PC Client Agent install package executes and installs the PC Client Agent code 54 automatically, thereby allowing full communications with the ADMP system 60.

Step 31. PC Client Requests Boot Refresh

The ADMP system 60 will interrogate the PC Client. The ADMP will retrieve a content map (a list of all content that should be resident on that PC Client) from the master database that is specifically associated with that PC Client by comparing the IP address and machine name. Once the content map is retrieved, the ADMP system 60 resolves local availability of all content. If some content is not available locally, then the ADMP retrieves the missing content from available resources, and then constructs a complete content package. A copy of the content is stored in a database for later use.

The ADMP system issues a load packet to the PC Client. The ADMP system forwards a special boot image to the PC Client. The PC Client receives the image and executes it. The special boot image is an executable program load module, a software program that continues the remote process communications and includes a full functioning DOS image along with a control program that performs communications and storage I/O.

The executable program load module formats the hard drive according to the parameters that were identified in the complete content package. Next, the module retrieves and places on the hard drive, the complete content package. After placing the entire content on the hard drive, the module forces a hard reset and cold boot of the PC Client. Once the PC Client re-boots, the PC Client Agent code installs itself automatically, thereby resuming full communications with the ADMP system.

Step 32. PC Client Requests Online Full Refresh of All Content

In the Agent initiated method, the Agent requests the ADMP system to send a full content package.

The ADMP will retrieve a content map (a list of all content that should be resident on that PC Client) from the master database that is specifically associated with that PC Client by comparing the IP address and machine name. Once the content map is retrieved, the ADMP utilizes the local master database of content as a source to create the full refresh for the PC Client. If some content is not available locally, then the ADMP retrieves the missing content from available resources such as the internet portal server with a manufacturer's master database of content, and then constructs a complete content package. A copy of the content is stored in a database for later use.

The ADMP transmits a complete copy of the agent installation software, which is executed and installed. This latest version of the agent code communicates with the ADMP system, receives the content package instructions, and performs the necessary housekeeping routines that prepare a full content load. The hard drive is reformatted and partitioned as necessary. The agent code then receives the content package and places the content on the hard drive as instructed.

The agent reboots the machine.

The term "content" as used in the appended claims is intended to mean all "soft" content, i.e. content which is non-hardware as described above in the specification.

The instant invention has been shown and described herein in what is considered to be the most practical and preferred embodiment. It is recognized, however, that departures may be made there from within the scope of the invention and that obvious modifications will occur to a person skilled in the art. It is intended that the claims herein cover all such departures and obvious modifications.

What is claimed is:

1. A data processing local area network (LAN) comprising:

a plurality of client data processing units for processing application programs under the control of respective operating systems;

a server data processing unit coupled to said client units via a network communication path for processing information under the control of a network operating system;

each of said units having a respective network address;

each of said client units having a respective stored content including a plurality of different types of content elements, said plurality of types of content elements including more than one type of content elements selected from operating systems, applications, application settings, shared documents, and personal documents;

a defined one of said units comprising a centrally accessed host computer;

first program controlled means for searching the network and for compiling and maintaining in said host computer a list of connected client units with their respective network addresses and machine names;

second program controlled means for establishing peer-to-peer communication between the host computer and the client units;

third program controlled means in each connected client unit for constructing a client content map including entries for each content element in the respective client unit, the location of the element in the PC Client unit and a unique identifier for the element, with the client content map entries for the PC Client including the entire software content for that PC Client;

fourth program controlled means for determining which content elements are unique to one client unit and which client elements are common to two or mole client units;

fifth program controlled means for creating and maintaining in said centrally accessed computer a master database including one copy of each common content element and one copy of each unique content element, wherein the common element and unique content element includes content elements of a plurality of different types of content selected from operating systems, applications, application settings, shared documents, and personal documents; and sixth program controlled means for constructing in said centrally accessed computer a master map for all client content elements, whereby the centrally accessed computer contains a master map and a copy of the entire software content for each PC Client and whereby the entire software content of any PC Client may be transferred to that PC Client to restore its software image.

2. The data processing local area network of claim 1 wherein said defined one unit is a client unit comprising the centrally accessed host computer.

3. The data processing local area network of claim 2 wherein said second program controlled means comprises program controlled means for installing an agent program in each client unit; and program controlled means in the host computer interacting with agent program controlled means for establishing peer-to-peer communication between the host computer and the client units.

4. The data processing local area network of claim 2 further comprising program controlled means for performing full content leads of the client units, as required, from the master database and from network resources.

5. The data processing local area network of claim 2 further comprising program controlled means for restoring content in the client units, as required, from the master database, to provide a copy of content of a previously stored version and program controlled means for distributing new content from the centrally accessed computer to predetermined ones of the client units.

6. The data processing local area network of claim 2 further comprising program controlled means for updating client content maps from the master map and for updating the master map from the client content maps and wherein said unique identifiers are used to locate ad access corresponding content elements in the master database and to update local and master maps.

7. The data processing local area network of claim 2 further comprising;

program controlled means for creating a server content map and for including entries of the server content map in the master map; and program controlled means for storing server content in the master database.

8. The da processing local area network of claim 3 further comprising;

program controlled means in the server unit for establishing peer-to-peer communication between the local area network and a second local area network for management of the full content of the PC client units on both networks by the host computer of the first mentioned local area network, whereby a server may boot the operating system of a PC client through the local area network.

9. A data processing local area network (LAN) comprising:

a plurality of client data processing units for processing application programs under the control of respective operating systems;

a server data processing unit coupled to said client units via a network communication path for processing information under the control of a network operating system;

each of said units having a respective network address;

each of said client units having a respective stored content including a plurality of different types of content elements;

a defined one of said client units comprising centrally accessed host computer initialized with a content management program and having means for directly communicating with the other units;

means controlled by said content management program for searching the network for connected client units and for compiling and maintaining in said one client unit a list of connected client units with their respective network addresses and machine names;

said content management program including client agent code and means for transferring client agent code to each client unit, said agent code including an operating system whereby machines which cannot boot with the local operating system may be booted through code loaded through the network;

means controlled by said content management program and said client agent code for effecting peer-to-peer communication between the host computer and the client units;

means controlled by said client agent code in each client unit for scanning all of the client unit software content, element by element, and for constructing and maintaining a client content map on its respective client unit for all software content elements, their respective locations in storage and a multi-bit hash value of each content element that uniquely identifies the element;

means controlled by said content management program and said client agent code for creating and maintaining in said host computer an updated master content map including entries corresponding to those in all of the client content maps;

means controlled by said content management program for determining which content elements are unique to one specific client unit and which content elements are common to at least two client units; and means controlled by said content management program for creating and maintaining in said host computer a master database having one copy only of each unique content element and one copy only of each common content element.

10. An article of manufacture comprising a computer useable medium for use in a PC client/server network system having computer readable program code means embodied therein for creating a copy of and managing in a host one of the PC clients all of the content elements of all PC clients in the network, said computer readable program code means in said article of manufacture comprising computer readable program code means for creating and maintaining in each PC client a local map of all software content elements stored in the PC client;

computer readable program code means for creating and maintaining in the host PC client a master database including one copy only of all content elements common to two or more of said PC clients and one copy only of all content elements unique to one of the PC clients; and computer readable program code means for creating and maintaining in the host PC client an updated master map of all common and unique content elements included in the PC client local maps, said master map of common and unique content elements being updated when the code in one client changes and is no longer common content element and is therefore treated as a unique content element.

11. The article of manufacture set forth in claim 10 wherein said computer readable program code means further comprises computer readable program code means for establishing peer-to-peer communication between the host PC client and the other PC clients.

12. The article of manufacture set forth in claim 10 wherein said computer readable program code means further comprises computer readable program code means for restoring a previously-saved version of content in the client units, as required, from the master database.

13. The article of manufacture set forth in claim 10 wherein said computer readable program code means further comprises computer readable program code means for performing full content loads of client units, as required, from the master database and from network resources.

14. A computer program product for use with a data processing network including a plurality of PC client units and a server unit coupled to the PC client units via a net communication path, said computer program product comprising a computer useable medium having computer readable program code means embodied in said medium for automatically managing the full software content of the PC client units in the network as a collected and shared resource, said computer program product including;

computer readable first program code means for creating and maintaining in each PC client unit a local map having an entry for each content element of the full software content stored in the PC client unit;

computer readable second program code means for determining which content elements are unique to a respective one of the PC client units and which content elements are common to two or more of the PC client units;

computer readable third program code means for creating and maintaining in a host one of said PC client units a master map including all content element entries of the PC client local maps;

and computer readable fourth program code means for creating and maintaining in the host unit one copy of each unique content element and one copy of each common content element, whereby the full software content of a PC client computer may be copied from the host unit.

15. The computer program product of claim 14 further comprising;

computer readable fifth program code means for establishing peer-to-peer communication between the host unit and the other PC client units.

16. The computer product of claim 14 further comprising;

computer readable sixth program code means for restoring a previously-saved version of content in the PC Client units, as required, from said content elements in the host unit.

17. The computer program product of claim 14 further comprising;

computer readable seventh program code means performing full content loads of PC client units, as required, from said content elements in the host unit and from network resources.

18. The computer program product of claim 14 further comprising computer readable eighth program code means for distributing new content from the host unit to predetermined ones of the PC Client units.

19. The computer program product of claim 14 wherein said fourth program code means creates and maintains in the host unit only one copy of each unique content element and only one copy of each common content element.

20. The computer program product of claim 14 wherein each content element entry in the local map and the mater map includes a unique identifier for the content element which is used by the computer readable first, second and third program code means for creating and maintaining the local and master maps and which is used by the computer readable fourth program code means to locate the content element in the host unit.

21. The computer readable product set forth claim 14 wherein the computer readable fourth program code means includes computer readable program code means in each PC Client unit sending its respective local map to the host unit for inclusion into the master map;

computer readable program code means for generating a request item in a list to be sent to the PC Client unit for each local map entry that does not exist in the master map;

computer readable program code means sending the list to the PC Client unit;

computer readable program code means for transferring a copy of the content elements corresponding to the request item list from the PC Client unit to a master database in the host unit; and computer readable program code means for updating the master map to include entries for the transferred copies of content elements.

22. A method of providing an image of the entire software contents to a first client computer from a second client computer having a complete copy of the content previously stored on the first client computer, the steps of the method comprising:

coupling the first and second client computers to a server;

generating a list of the elements in the image of the entire software contents of a first client computer and storing the list on the second client computer;

storing a copy of the list of elements in the image of the entire software contents of the first client computer on the second client computer including the step of determining whether an element is a common element or a unique element and storing each common element in the second client computer only once;

in response to determining that a copy of the contents of the second client computer is needed at the first client computer, determining the contents of the first client computer from the stored list of contents; and providing a copy of the common elements and the unique elements of contents of the first client computer from the second client computer to the first client computer.

23. A method of providing contents to a first client computer from a second client computer including the steps of claim 22 wherein the step of storing by determining unique elements includes the step of determining if a common element has been altered and, if so, treating it as a unique element.

* * * * *